United States Patent
Huang et al.

(10) Patent No.: US 10,955,884 B2
(45) Date of Patent: Mar. 23, 2021

(54) METHOD AND APPARATUS FOR MANAGING POWER IN A THERMAL COUPLE AWARE SYSTEM

(71) Applicant: Advanced Micro Devices, Inc., Sunnyvale, CA (US)

(72) Inventors: Wei Huang, Austin, TX (US); Manish Arora, Sunnyvale, CA (US); Abhinandan Majumdar, Ithaca, NY (US); Indrani Paul, Austin, TX (US); Leonardo de Paula Rosa Piga, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 5 days.

(21) Appl. No.: 15/071,643

(22) Filed: Mar. 16, 2016

(65) Prior Publication Data

US 2017/0269651 A1    Sep. 21, 2017

(51) Int. Cl.
*G06F 1/20* (2006.01)
*G06F 1/324* (2019.01)
*G06F 1/329* (2019.01)
*G06F 1/3296* (2019.01)

(52) U.S. Cl.
CPC .............. *G06F 1/206* (2013.01); *G06F 1/324* (2013.01); *G06F 1/329* (2013.01); *G06F 1/3296* (2013.01); *Y02D 10/00* (2018.01)

(58) Field of Classification Search
CPC .............................. G06F 1/3203; G06F 1/206
See application file for complete search history.

(56) References Cited

U.S. PATENT DOCUMENTS

| | | | |
|---|---|---|---|
| 2006/0004538 A1* | 1/2006 | Cancel | G06F 1/206 702/136 |
| 2007/0124124 A1* | 5/2007 | Aguilar, Jr. | G06F 1/206 703/6 |
| 2011/0213508 A1* | 9/2011 | Mandagere | G06F 1/3203 700/291 |
| 2015/0286225 A1* | 10/2015 | Park | G05D 23/1917 700/299 |

* cited by examiner

*Primary Examiner* — Kim Huynh
*Assistant Examiner* — Joshua Neveln
(74) *Attorney, Agent, or Firm* — Volpe Koenig

(57) ABSTRACT

A method and apparatus for managing power in a thermal couple aware system includes determining a candidate configuration mapping based upon one or more criteria, the candidate configuration mapping being a mapping of performance for a candidate configuration of processor sockets in the thermal couple aware system. The candidate configuration mapping is evaluated by comparing the candidate configuration mapping to a stored configuration. If the evaluated candidate configuration mapping provides a better metric than the stored configuration, the stored configuration is updated with the evaluated candidate configuration mapping, and programming instructions are executed in accordance with the candidate configuration mapping if no other configuration mappings are to be determined.

18 Claims, 3 Drawing Sheets

METHOD AND APPARATUS FOR MANAGING POWER IN A THERMAL COUPLE AWARE SYSTEM

FIELD OF THE INVENTION

The present invention is generally directed to power management, and more particularly, to a method and apparatus for managing power in a thermocouple aware system.

BACKGROUND

In order to accommodate the need for greater computer processing power, servers may include multiple processor sockets in one unit. As these processor sockets operate, they generate heat that can affect their own performance, as well as the performance of other processors in the server due to thermal coupling between the processor sockets caused by the ambient air in the server being heated.

To counteract this performance degradation, various cooling methods have been employed to cool processor sockets. For example, cooling fans, liquid cooling, and immersion cooling systems may be employed to cool the ambient air and the processor sockets so they may operate more effectively. However, some cooling systems, (e.g., fans), cool the air from one side of the server, creating a temperature gradient where processor sockets that are closer to the fan are cooler than processors farther from the fan, allowing the cooler processor sockets to perform at a higher performance level than those farther away.

Conventional processing assignment systems assign workloads based on the processor temperature. Therefore, given a system with homogeneous processor designs, more workloads and more power are assigned to the coolest processor, (e.g., the processor on the socket closest the cooling system). When thermal coupling is considered, the conventional assignment systems techniques may lead to more frequent thermal throttling, non-identical performance among sockets, and degraded overall performance.

It would therefore be beneficial to provide a method and apparatus for more effectively managing power in a thermal couple aware system.

SUMMARY OF EMBODIMENTS

An embodiment directed to a method of performing power management is disclosed. The method includes determining a candidate configuration mapping based upon one or more criteria, the candidate configuration mapping being a mapping of performance for a candidate configuration of processor sockets in the thermal couple aware system. The candidate configuration mapping is evaluated by comparing the candidate configuration mapping to a stored configuration. If the evaluated candidate configuration mapping provides a better metric than the stored configuration, the stored configuration is updated with the evaluated candidate configuration mapping, and programming instructions are executed in accordance with the candidate configuration mapping if no other configuration mappings are to be determined.

An embodiment directed to an apparatus is disclosed. The apparatus includes a memory configured to store information and a processor operatively coupled to the memory. The processor is configured to determine a candidate configuration mapping based upon one or more criteria, the candidate configuration mapping being a mapping of performance for a candidate configuration of processor sockets in the thermal couple aware system, evaluate the candidate configuration mapping by comparing the candidate configuration mapping to a stored configuration stored in the memory, update the stored configuration with the evaluated candidate configuration mapping if the evaluated candidate configuration mapping provides a better metric than the stored configuration, and execute programming instructions in accordance with the candidate configuration mapping if no other configuration mappings are to be determined.

An embodiment directed to a non-transitory computer readable storage medium is disclosed. The non-transitory computer readable storage medium has instructions recorded thereon that, when executed by a computing device, cause the computing device to perform operations. The operations include determining a candidate configuration mapping based upon one or more criteria, the candidate configuration mapping being a mapping of performance for a candidate configuration of processor sockets in the thermal couple aware system, evaluating the candidate configuration mapping by comparing the candidate configuration mapping to a stored configuration, updating the stored configuration with the evaluated candidate configuration mapping if the evaluated candidate configuration mapping provides a better metric than the stored configuration, and executing programming instructions in accordance with the candidate configuration mapping if no other configuration mappings are to be determined.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description of the embodiments is provided below, briefly a method and apparatus are described for managing power in a thermal couple aware system. By utilizing knowledge of the type of cooling system used and estimating processor temperatures based upon workloads to compare metrics, a mapping can be determined to identify what candidate workload assignments provide enhanced performance.

Figure 1:
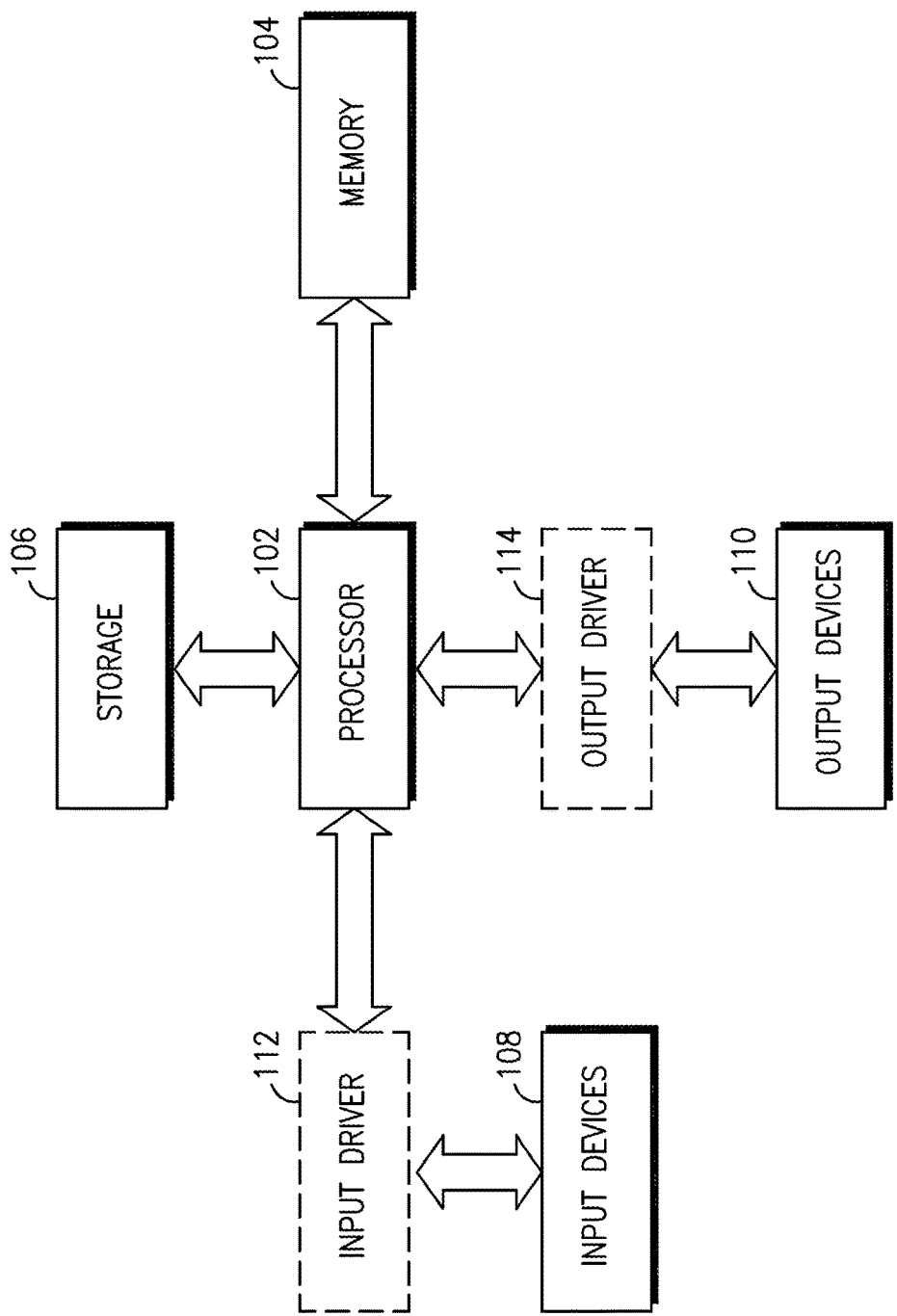
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

Figure 2:
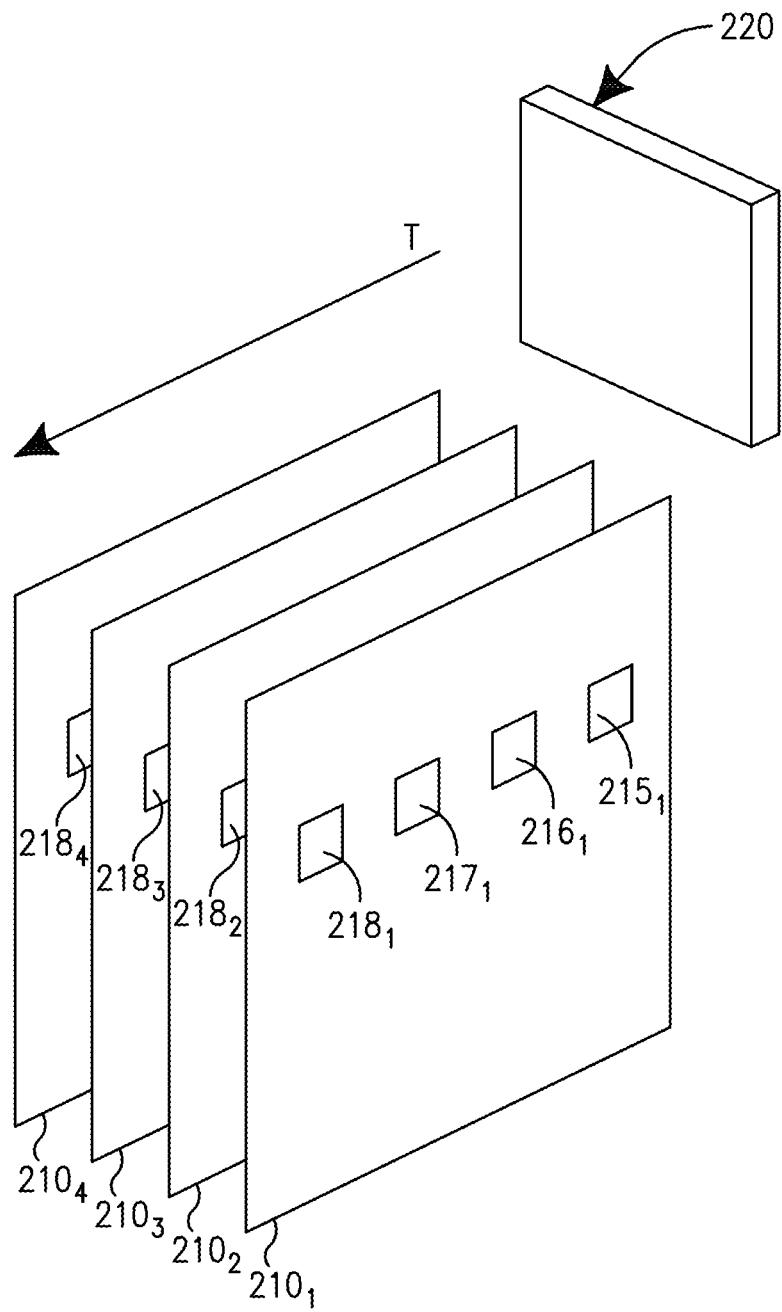
FIG. 2 is a schematic representation of an example architecture of a server performing power management in a thermal couple aware system according to an embodiment.

FIG. 2 is a schematic representation of an example architecture of a server 200 performing power management in a thermal couple aware system according to an embodiment. The server 200 includes one or more processing cards 210, (designated $210_1$, $210_2$, $210_3$, and $210_4$) and a cooling system 220. The processing cards 210 each include at least one processor socket, (e.g., processors), designated 215, 216, 217, and 218. The processor sockets may be substantially similar to those described as processor 102 of FIG. 1. In the example server 200 shown in FIG. 2, each processing card 210 is shown to have four processor sockets. That is, processing card $210_1$ may include processing sockets $215_1$, $216_1$, $217_1$ and $218_1$. Processing card $210_2$ may include processor sockets $215_2$, $216_2$, $217_2$ and $218_2$ ($215_2$, $216_2$, $217_2$ not shown). Processing card $210_3$ may include processor sockets $215_3$, $216_3$, $217_3$ and $218_3$ ($215_3$, $216_3$, $217_3$ not shown). Processing card $210_4$ may include processor sockets $215_4$, $216_4$, $217_4$ and $218_4$ ($215_4$, $216_4$, $217_4$ not shown). It should be noted that in FIG. 2, the cooling system 220 may be any type of cooling system such as a cooling fan, liquid cooling system, immersion system, or the like.

As shown in FIG. 2, the cooling system 220 is located to the right of processing cards 210. Accordingly, the temperature (T) increases in the direction of the arrow shown. That is, the ambient air is cooler toward the beginning of the arrow T and warmer toward the tip of the arrow T. Therefore, processor socket $215_1$ (as well as $215_2$, $215_3$, and $215_4$) operates at a cooler temperature than the processor sockets 216, 217 and 218.

Figure 3:
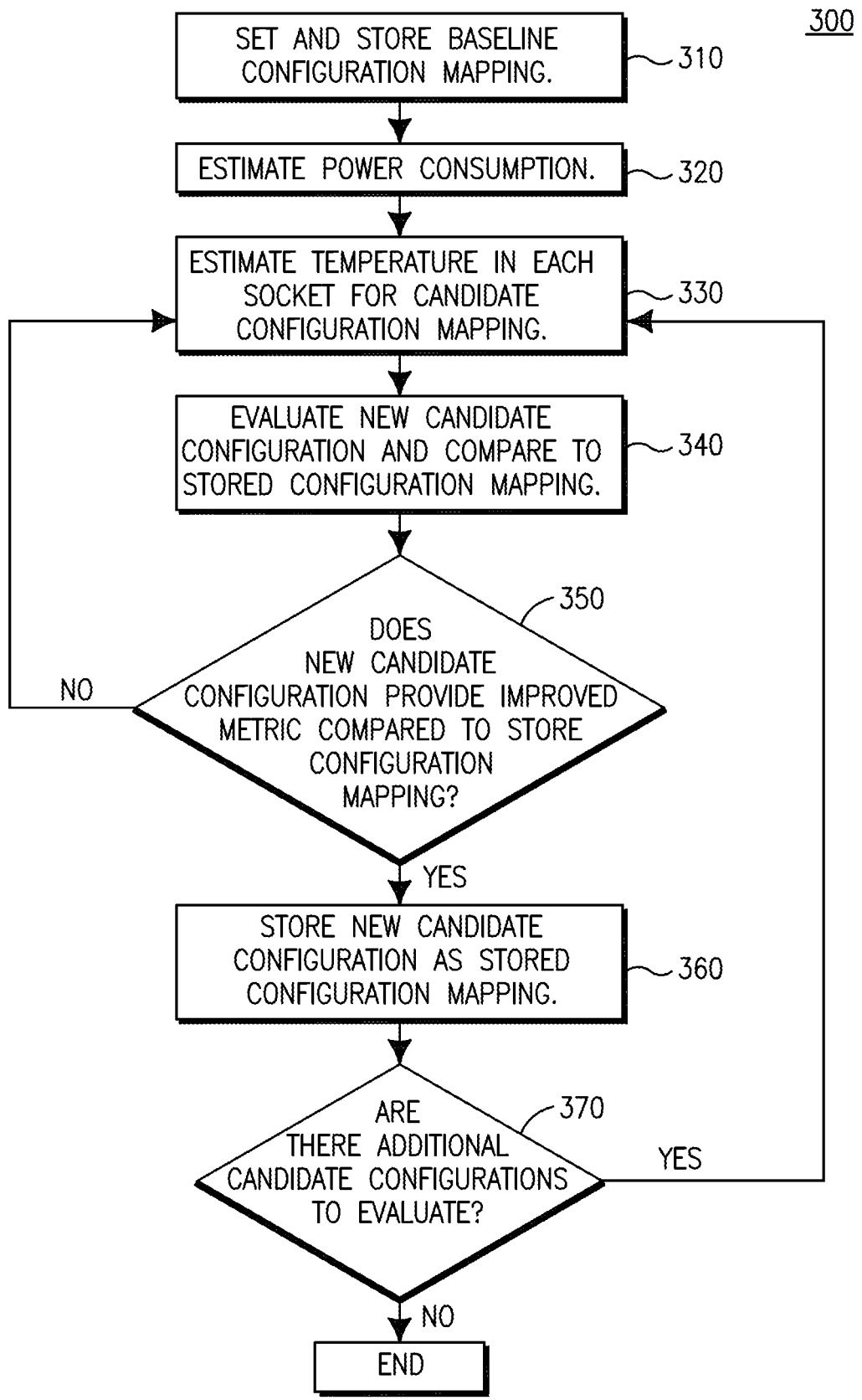
FIG. 3 is a flow diagram of an example method of managing power in a thermal couple aware system according to an embodiment.

FIG. 3 is a flow diagram of an example method 300 of managing power in a thermal couple aware system, (e.g., server 200), according to an embodiment. In step 310, a baseline candidate configuration mapping is set and stored.

The power consumption is then estimated (step 320). This may be performed in different ways depending on the type of workload to be processed. For example, for an embodiment where a workload runs in parallel threads across multiple processing sockets 215, 216, 217 and/or 218, the power consumption of the next parallel workload to be dispatched is estimated. While in a multi-programming case where different entire workloads are assigned to different processing sockets 215, 216, 217 and/or 218, the power consumption of the multiple workloads to be dispatched may be estimated.

Once the power consumption has been estimated in step 320, the temperature in each socket is estimated in order to determine a configuration candidate mapping (step 330), which is a mapping of performance for a particular candidate configuration of processor sockets. For example, to perform steps 320 and 330, during runtime a centralized system software, (e.g., an operating system module or system management software), may take statistics such as ambient air temperatures, silicon temperatures, and power consumption, from all processing sockets 215, 216, 217 and 218. Additionally, operating points such as voltage, frequency, number of cores enabled in each processor socket, and memory bandwidth may be considered in each configuration candidate mapping. The system software may also derive application-level power consumption based on core-level performance counters, if multiple applications run on different cores in the same processing socket 215, 216, 217 or 218. In order to perform these estimates, the processor performance and temperatures while operating at various frequencies and power levels may be simulated. Steps 320 and 330 and the criteria estimated may be utilized to determine a configuration mapping for candidate.

In step 340, a new candidate configuration is evaluated and compared to a currently stored configuration mapping to determine whether it provides an improved metric. For example, in an embodiment where a workload is processed in parallel across multiple processing sockets, the standard deviation of silicon temperatures across all processor sockets may be evaluated as the metric. In an embodiment where multiple workloads are assigned in parallel to different sockets, the maximum combined performance or temperature of all sockets may be evaluated as the metric. Another metric may be the performance per watt of each socket.

If the new candidate configuration mapping under evaluation provides a better metric than the existing stored configuration mapping (step 360), then the new candidate configuration is stored, replacing the existing configuration mapping (step 360). Otherwise, the method reverts to step 330, where the next candidate mapping is evaluated. If all the candidate configurations have been evaluated (step 370), then the method 300 ends. Otherwise the method 300 reverts to step 330 to evaluate the next candidate mapping. If all the candidate mappings have been evaluated (step 370), the application threads or applications may be re-scheduled to their new optimal locations for execution just derived by the method 300. That is an execution scheme is determined for applications and/or threads of an application. The execution scheme may include allocating more or less power to a particular processor socket (215, 216, 217, 218), and/or varying the operating frequency of one or more of the processor sockets.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method implemented in a thermal couple aware computer system, comprising:
    determining, by a processor of the thermal couple aware computer system, a candidate configuration mapping for a plurality of processing cards including a plurality of processor sockets being cooled by a cooling system of the thermal couple aware computer system;
    determining silicon temperatures for each of the plurality of processor sockets based on the candidate configuration mapping;
    calculating a standard deviation of the silicon temperatures across all of the plurality of processor sockets;
    evaluating, by the processor, the candidate configuration mapping by comparing the standard deviation of the silicon temperatures to a stored configuration stored in a memory operatively coupled to and in communication with the processor;
    updating, by the processor, the stored configuration with the candidate configuration mapping when the standard deviation of the silicon temperatures is less than the stored configuration; and
    executing, by the processor, programming instructions in accordance with the candidate configuration mapping if no other configuration mappings are to be determined, wherein the processor adjusts a power consumption and an operating frequency of one or more of the plurality of processor sockets based upon the candidate configuration mapping.

2. The method of claim 1, wherein the candidate configuration mapping is further evaluated based on one or more of the following: power consumption of a workload to be executed, temperature of one or more of the plurality of processing sockets in the system during execution, processor operating frequency during execution, or processor power during execution.

3. The method of claim 2, wherein the candidate configuration mapping is further evaluated based on a type of cooling system.

4. The method of claim 3, wherein the type of cooling system includes one or more of the following: a cooling fan, a liquid cooling system, or an immersion cooling system.

5. The method of claim 4, wherein the type of cooling system is determined based upon a configuration setting.

6. The method of claim 1, further comprising determining additional candidate configuration mappings based upon additional criteria if other configuration mappings are to be determined.

7. The method of claim 1 wherein the programming instructions to be executed are multiple threads of an application.

8. The method of claim 1 wherein the programming instructions to be executed are multiple applications for parallel execution.

9. The method of claim 1, further comprising determining a first configuration mapping as the stored configuration.

10. A thermal couple aware computer system, comprising:
    a memory configured to store information; and
    a processor operatively coupled to the memory and in communication with the memory, the processor configured to:
    determine a candidate configuration mapping for a plurality of processing cards including a plurality of processor sockets being cooled by a cooling system of the thermal couple aware computer system,
    determine silicon temperatures of each of the plurality of processor sockets based on the candidate configuration mapping,
    calculate a standard deviation of the silicon temperatures across all of the plurality of processor sockets,
    evaluate the candidate configuration mapping by comparing the standard deviation of the silicon temperatures to a stored configuration stored in the memory,
    update the stored configuration with the candidate configuration mapping when the standard deviation of the silicon temperatures is less than the stored configuration, and
    execute programming instructions in accordance with the candidate configuration mapping if no other configuration mappings are to be determined, wherein the processor adjusts a power consumption and an operating frequency of plurality of the processor sockets based upon the candidate configuration mapping.

11. The thermal couple aware computer system of claim 10, wherein the candidate configuration mapping is further evaluated based on one or more of the following: power consumption of a workload to be executed, temperature of one or more of the plurality of in the system during execution, processor operating frequency during execution, or processor power during execution.

12. The thermal couple aware computer system of claim 11, wherein the candidate configuration mapping is further evaluated based on a type of cooling system.

13. The thermal couple aware computer system of claim 12, wherein the type of cooling system includes one or more of the following: a cooling fan, a liquid cooling system, or an immersion cooling system.

14. The thermal couple aware computer system of claim 13, wherein the type of cooling system is determined based upon a configuration setting.

15. The thermal couple aware computer system of claim 10, wherein the processor is further configured to determine additional candidate configuration mappings based upon additional criteria if other configuration mappings are to be determined.

16. A non-transitory computer readable storage medium, having instructions recorded thereon that, when executed by a computing device of a thermal couple aware computer system, cause the computing device to perform operations comprising:

determining, by a processor of the thermal couple aware computer system, a candidate configuration mapping for a plurality of a plurality of one or more processor sockets being cooled by a cooling system of the thermal couple aware computer system;

determining silicon temperatures for each of the plurality of processor sockets based on the candidate configuration mapping;

calculating a standard deviation of the silicon temperatures across all of the plurality of processor sockets;

evaluating, by the processor, the candidate configuration mapping by comparing the standard deviation of the silicon temperatures to a stored configuration stored in a memory operatively coupled to and in communication with the processor;

updating, by the processor, the stored configuration with the candidate configuration mapping when the standard deviation of the silicon temperatures is less than the stored configuration; and executing, by the processor, programming instructions in accordance with the candidate configuration mapping if no other configuration mappings are to be determined, wherein the processor adjusts a power consumption and an operating frequency of one or more of the plurality of processor sockets based upon the candidate configuration mapping.

17. The non-transitory computer readable storage medium of claim 16, wherein the candidate configuration mapping is further evaluated based on one or more of the following: power consumption of a workload to be executed, temperature of one or more of the plurality of processing sockets in the system during execution, processor operating frequency during execution, or processor power during execution.

18. The non-transitory computer readable storage medium of claim 17, wherein the candidate configuration mapping is further evaluated based on a type of cooling system.

\* \* \* \* \*